(12) United States Patent
Edirisooriya et al.

(10) Patent No.: US 10,990,546 B2
(45) Date of Patent: *Apr. 27, 2021

(54) HARDWARE-BASED VIRTUAL MACHINE COMMUNICATION SUPPORTING DIRECT MEMORY ACCESS DATA TRANSFER

(71) Applicant: Intel Corporation, Santa Clara, CA (US)

(72) Inventors: Samantha J. Edirisooriya, Tempe, AZ (US); Geetani R. Edirisooriya, Tempe, AZ (US); Roger C. Jeppsen, Gilbert, AZ (US); Pankaj Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,485

(22) Filed: Feb. 19, 2019

(65) Prior Publication Data

US 2019/0179786 A1  Jun. 13, 2019

Related U.S. Application Data

(63) Continuation of application No. 15/423,949, filed on Feb. 3, 2017, now Pat. No. 10,241,947.

(51) Int. Cl.
*G06F 13/28* (2006.01)
*G06F 9/455* (2018.01)
(Continued)

(52) U.S. Cl.
CPC .......... *G06F 13/28* (2013.01); *G06F 9/45533* (2013.01); *G06F 9/54* (2013.01);
(Continued)

(58) Field of Classification Search
CPC combination set(s) only.
See application file for complete search history.

(56) References Cited

U.S. PATENT DOCUMENTS 8,490,086 B1  7/2013  Cook et al.
9,940,263 B2  4/2018  Wibling et al.
(Continued)

OTHER PUBLICATIONS

Non-Final Office Action, U.S. Appl. No. 15/423,949, dated Apr. 19, 2018, 21 pages.
(Continued)

*Primary Examiner* — Raymond N Phan
(74) *Attorney, Agent, or Firm* — Nicholson De Vos Webster & Elliott LLP

(57) ABSTRACT

A processing system includes a processor and a VM-to-VM communication accelerator circuit comprising a first interface device to support direct memory access (DMA) data transfers by the first VM, a register to store a reference to a primary physical function (PF) associated with the first interface device, wherein the first primary PF is associated with an access control table (ACT) specifying an access permission for the first VM with respect to a second VM, and a direct memory access (DMA) descriptor processing circuit to process, using a working queue associated with the first primary PF, a DMA descriptor referencing a request for a DMA data transfer between the first VM and the second VM, and execute, using the first interface device, the DMA data transfer based on the access permission.

20 Claims, 12 Drawing Sheets

(51) Int. Cl.
*G06F 13/10* (2006.01)
*G06F 13/40* (2006.01)
*G06F 9/54* (2006.01)

(52) U.S. Cl.
CPC ........ *G06F 13/102* (2013.01); *G06F 13/4068* (2013.01); *G06F 2213/0026* (2013.01)

(56) References Cited

U.S. PATENT DOCUMENTS

| | | |
|---|---|---|
| 10,241,947 B2 * | 3/2019 | Edirisooriya ......... G06F 13/102 |
| 2005/0207407 A1 | 9/2005 | Baumberger |
| 2007/0083862 A1 | 4/2007 | Wooldridge et al. |
| 2007/0198976 A1 | 8/2007 | Leis et al. |
| 2009/0144510 A1 | 6/2009 | Wibling et al. |
| 2010/0217916 A1 | 8/2010 | Gao et al. |
| 2016/0034300 A1 | 2/2016 | Fukushima |
| 2016/0239430 A1 | 8/2016 | Tsirkin et al. |

OTHER PUBLICATIONS

Notice of Allowance, U.S. Appl. No. 15/423,949, dated Nov. 2, 2018, 5 pages.

* cited by examiner

300

| Virtual functions | Functions with shared memory space ||||||
|---|---|---|---|---|---|---|
| | L_PF | L_VF1 | L_VF2 | L_VFm | R_PF | R_VF1 | R_VFm |
| L_PF | X | r/w | r/w | r/w | r | r | r |
| L_VF1 | w | X | r/w | r/w | r | r | r |
| L_VF2 | w | r/w | X | X | | | |
| L_VFm | w | r | | X | | | |

HARDWARE-BASED VIRTUAL MACHINE COMMUNICATION SUPPORTING DIRECT MEMORY ACCESS DATA TRANSFER

This application is a continuation of U.S. patent application Ser. No. 15/423,949, filed Feb. 3, 2017, which is hereby incorporated in its entirety herein by reference.

TECHNICAL FIELD

Technical Field

The present disclosure relate to computing device virtualization and, more specifically, to providing hardware-based virtual machine (VM) to VM communication.

Background

A computing device may include one or more processing cores in one or more processors (such as central processing units (CPUs)) for executing instructions and a memory device (such as random-access memory (RAM)) for storing instructions and data associated with executing tasks (including user application and system application such as the kernel of an operating system) on the one or more processing cores. Instructions of each application program may access the memory using virtual addresses (or linear addresses) in a virtual memory address space. A memory management unit may use a page table to translate virtual addresses into physical addresses of the memory.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 illustrates an access control table including entries for storing access permissions between VMs according to an embodiment of the present disclosure.

DETAILED DESCRIPTION

Figure 1:
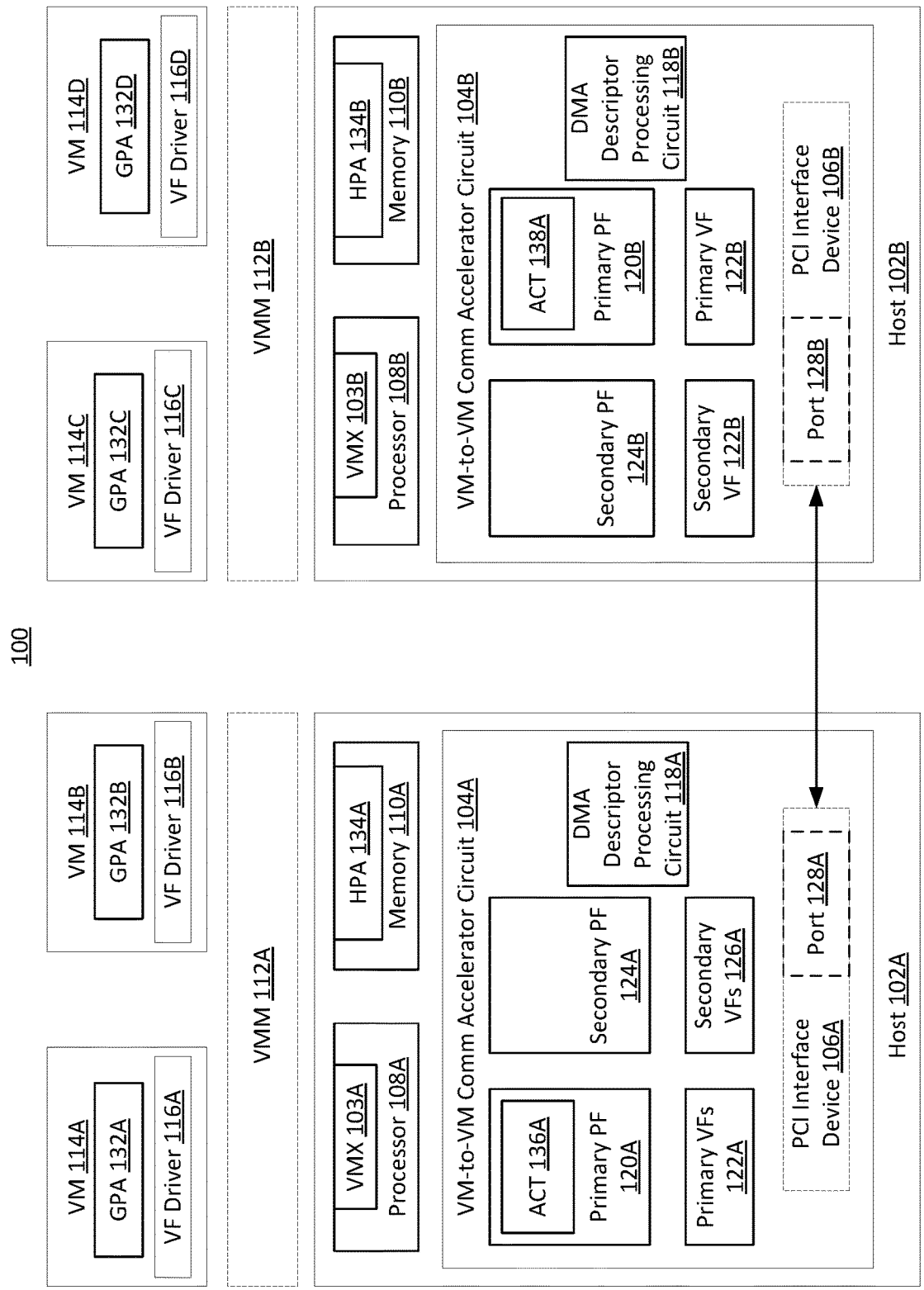
FIG. 1 illustrates a system that supports hardware-based data communication between VMs running on different hosts according to an embodiment of the present disclosure.

Computer hardware virtualization provides isolation between virtual machines. For example, a processor of a host machine (referred to as a host) may execute a virtual machine monitor (VMM) that may support multiple virtual machines (VMs). Each VM may include a guest operating system and run guest software applications. The VMM may employ an auxiliary page table (referred to as the extended page table (EPT)) to translate guest physical addresses (GPAs) used by a guest operating system to the host physical addresses (referred to as physical addresses) for accessing the memory used by the processor of the host machine. Additionally, VMMs may run on multiple hosts, and each one of the VMMs on different hosts may also support VMs. Each VM is an execution environment that is isolated from other VMs running on the same host or different hosts.

While the isolation provided by virtualization facilitates secured execution of software applications, VMs on a single host or on multiple hosts may often need to communicate with each other (e.g., to perform data sharing). Typically, responsive to a request from a first VM to communicate with a second VM, the VMM may intercept the request and emulate the communication channel between the two VMs—a process referred to as network virtualization. The emulation of the communication channel by the VMM is usually slow and inefficient. Despite various advances in network virtualization technology, the speed of data communication using network virtualization is still slower than those communication channels using inter-process communication on a non-virtual platform.

Embodiments of the present disclosure provide a hardware-based VM-to-VM communication solution that bypasses the VMM. The hardware-based solution utilizes different flavors of peripheral component interconnect (PCI) protocols (referred to, in this application, as PCIe including, for example, PCI SR-IOV and PCI Express protocol) to provide VM-to-VM communication, thus significantly improving the speed of data communication among VMs on a single host or on multiple hosts.

Embodiments of the present disclosure employ PCIe-enabled device to transmit data between VMs. Each PCIe-enabled device may be associated with a physical function that specifies parameters to operate the device. The physical function may include a full set of configurable parameters that define the capabilities of the PCIe-enabled device. Further, a PCIe-enabled device may support one or more virtual functions which can be associated with different VMs. A virtual function (VF) associated with a PF may include a subset of the configurable parameters specified in the PF. The VFs specify the resources needed for data communication from the corresponding VMs using the PCIe-enabled device that supports the Single Root I/O Virtualization (SR-IOV) protocol, where the VF is treated as a hot-plugged PCI device in the kernel.

In one embodiment, a host may include a VM-to-VM communication accelerator circuit (referred to as an accelerator) that may include registers for storing parameters of a physical function (e.g., a PCIe-enabled device) and for storing parameters of virtual functions associated with virtual devices of VMs. Once the PCIe virtualization is enabled, each VF's configuration space may be associated with a PCI memory space of the PF, where the PCI memory space is used to map a register set. The VF device driver operates on the register set. The VF can function and appear as the PF using the register set mapped to the PCI memory space. Further, the accelerator may include a processing unit for handling data communication sessions originated from VMs. The data transfer sessions are in the form of direct memory access (DMA), and the processing unit is referred to as a DMA descriptor processing circuit. A first VM may initiate data communication, destined to a second VM, by posting a DMA descriptor in registers associated with the virtual function of the first VM. The DMA descriptor may include a source address, a destination address, data payload (or reference to a data payload), a virtual function identifier of a second VM for receiving the data payload, and control parameters for establishing hardware-based VM-to-VM data communication. Responsive to receiving the DMA descriptor, the DMA descriptor processing circuit may inspect the parameters of the physical function to determine whether data communication is allowed between the first VM and the second VM. In one embodiment, the parameters of the physical function may specify an access control table that includes the communication permissions among different VMs. Responsive to determining that the data communication between the first VM and the second VM is allowed based on the access control table, the DMA descriptor processing circuit may enable the data communication between VMs based on PCIe protocol. If the data communication between the first VM and the second VM is not allowed (or failed for any reasons), the DMA descriptor processing circuit may notify the VMM.

The VMM may set the parameters of the physical function using a physical function driver, and set the parameters of the virtual function using a virtual function driver. In one embodiment, responsive to creating a new VM, the VMM may generate the virtual function associated with the newly created VM and store, in registers in the accelerator, the parameters of the virtual function. Once the PCIe virtualization is enabled, each VF's configuration space may be associated with a PCI memory space of the PF, where the PCI memory space is used to map a register set. The VF device driver operates on the register set. The VF can function and appear as the PF using the register set mapped to the PCI memory space. Further, VMM may update the parameters of the physical function to reflect the added VM. For example, the VMM may update the access control table to add data communication permissions for the newly added VM.

FIG. 1 illustrates a system 100 that supports hardware-based data communication between VMs running on different hosts according to an embodiment of the present disclosure. Referring to FIG. 1, system 100 may include hosts 102A, 102B. Hosts 102A, 102B may each respectively include a processor 108A, 108B, a memory 110A, 110B and a VM-to-VM communication accelerator circuit ("accelerator") 104A, 104B. In one embodiment, host 102A (or host 102B) can be a system-on-a-chip (Soc).

Processor 108A, 108B may be a hardware processing device such as, for example, a central processing unit (CPU) or a graphic processing unit (GPU) that includes one or more processing cores (not shown) to execute software applications. Processor 108A, 108B may further include one or more processing cores and a memory management unit (MMU) to perform memory address translation.

Processor 108A, 108B may further include processor extension logic circuits to implement extended instruction sets to support additional functionalities of processor 108A, 108B. In one embodiment, processor extension logic circuits may support execution of a set of virtualization instructions (e.g., virtual-machine extension (VMX) 130A, 130B) to provide support for one or more virtualization environments ported on host. The VMX 130A, 130B may provide processor-level support for virtual machines. In one embodiment, the VMX may include instructions to generate virtual machine monitors (VMMs) 112A, 112B that support one or more execution environments (or virtual machines (VMs) 114A-114D) to run on the hosts 102A, 102B.

Each one of VMs 114A-114C may behave like a hardware computing device to end users. For example, VMs 114A-114C may each include a virtual processor (not shown) that emulates a hardware processor. The virtual processor associated with VMs 114A-114C may support a respective guest operating system (guest OS). Guest applications may run within the environments of guest OS. Guest operating systems 134 (including kernels) can include a number of guest-OS components (or kernel components) to provide a number of services to guest applications. In one embodiment, the guest-OS-provided services may include scheduler, process management, I/O management, memory management, drivers (e.g., file system and volume drivers, mass storage drivers, and bus drivers), and code integrity management services.

VMs 114A-114C including guest OS and guest applications may access memory 110A, 110B through memory address translation. A VM 114A-114C may be associated with a corresponding guest physical address (GPA) space 132A-132C. The GPA space 114A-114C associated with VMs 114A-114C may be mapped to a host physical address (HPA) space 134A-134B of the memory 110A, 110B of host 102A, 102B. As shown in FIG. 1, GPA space 132A-132B associated with VMs 114A-114B may be mapped to HPA space 134A; GPA space 131C-132D associated with VMs 114C-114D may be mapped to HPA space 134B. In one embodiment, the memory address mapping may be achieved using direct memory access (DMA) using PCIe-enabled devices, bypassing VMMs 112A-112B. This DMA approach can improve the speed of data communication between two VMs.

In one embodiment, hosts 102A, 102B may employ accelerators 104A, 104B to provide the capabilities for hardware-based VM-to-VM data communication. Each one of accelerator 104A, 104B may include a DMA descriptor processing circuit 118A, 118B, registers (120A, 120B, 122A, 122B, 124A, 124B, 126A, 126B) to store different types of physical functions and virtual functions, and a PCI interface device 106A, 106B (e.g., underlying physical network controllers (NICs)) to provide the underlying data communication links. In another embodiment, PCI interface device 106A, 106B may be external to accelerator circuit 104A, 104B. DMA descriptor processing circuit 118A, 118B may include logic circuits to process a DMA descriptor received from VMs 114A-114C based on physical functions associated with PCI interface device 106A, 106B and virtual functions associated with VMs 114A-114C. Accelerators 104A, 104B may include registers (e.g., memory-mapped registers (MMRs)) to store physical functions and virtual functions. In one embodiment, accelerators 104A, 104B include registers to store a primary physical function 120A, 120B associated with PCI interface device of the local host and primary virtual functions 122A, 122B associated with virtual devices of VMs 114A-114B, 114C-114D supported by the local host. Further, accelerators 104A, 104B include registers to store a secondary physical function 126A, 126B associated with PCI interface device of a remote host and secondary virtual functions 128A, 128B associated with VMs 114C-114D, 114A-114B supported by the remote host.

For example, host 102A may include PCI interface device 106A that serve as the primary physical function 120A and support VMs 114A, 114B associated with virtual functions 122A. Additionally, accelerator 104A of host 102A may include registers to store parameters associated with a secondary physical function 124A that specifies PCI interface device 106B of host 102B, and may further include registers to store secondary virtual functions 126A associated with VMs 114C-114D supported by remote host 102B. Similarly, host 102B may include PCI interface device 106B that serve as the primary physical function 120B and support VMs 114C, 114D associated with virtual functions 122B. Additionally, accelerator 104B of host 102B may include registers to store parameters associated with a secondary physical function 124B that specifies PCI interface device 106A of host 102A, and include registers to store secondary virtual functions 126B associated with VMs 114A-114B supported by remote host 102A.

In one embodiment, primary physical functions 120A, 120B may be correspondingly associated with an access control table 136A, 136B. In another embodiment, primary physical functions 120A, 120B may access the access control table stored in another storage device other than the primary functions. Access control table 136A, 136B may contain parameters that specify the permissions for data communication between VMs. The permissions may define the access rights (e.g., read, write, or execution) for data communication between VMs on a same host or between VMs on different hosts. Responsive to a VM 114A-114D posting (using virtual function driver 116A-116D) a DMA descriptor containing information about a VM-to-VM data communication request, DMA descriptor processing circuit 118A-118B may, based on the access control table 136A, 136B, determine whether to allow the VM-to-VM data communication to occur.

In one embodiment, PCI interface device 106A, 106B including PCI bus provides data communication links between processors 108A, 108B. For example, PCI interface device 106A, 106B can be a root complex interface that is communicatively coupled between processors 108A, 108B to the PCI bus of host 102A, 102B to allow hardware-based VM-to-VM data communication (e.g., between processor 108A and PCI bus of host 102A and between processor 108B and PCI bus of host 102B). In some implementations, PCI interface devices 106A, 106B may include an interface to processors and an interface to memory, and optionally a controller.

In one embodiment, PCI interface devices 106A, 106B may each support a port 128A, 128B to provide point-to-point communication between hosts (e.g., between hosts 102A, 102B). In some implementations, a non-transparent bridge (NTB) may be communicatively coupled between the hosts. The NTB may provide electrical isolation between the two hosts 102A, 102B. Each host separated by the NTB may have its own independent address domain. Thus, the host on one side of NTB does not have visibility of the complete memory or I/O space of the other side. To communicate across the NTB, each local host may expose a portion (referred to as an aperture) of memory space to the remote host so that writes to the exposed portion of memory of the local host are mirrored in the remote host through the aperture. In this way, VMs on different hosts using direct memory access can establish DMA data communication based on PCIe protocols. In one embodiment, an external root manager may handle mapping between the exposed memory portion of host 102A and the exposed memory portion of host 102B through a registration process. During the registration process, the external root manager may store the mappings and access permissions of a remote HPA to the local HPA in the secondary physical functions 124A, 124B of the local host.

Figure 2:
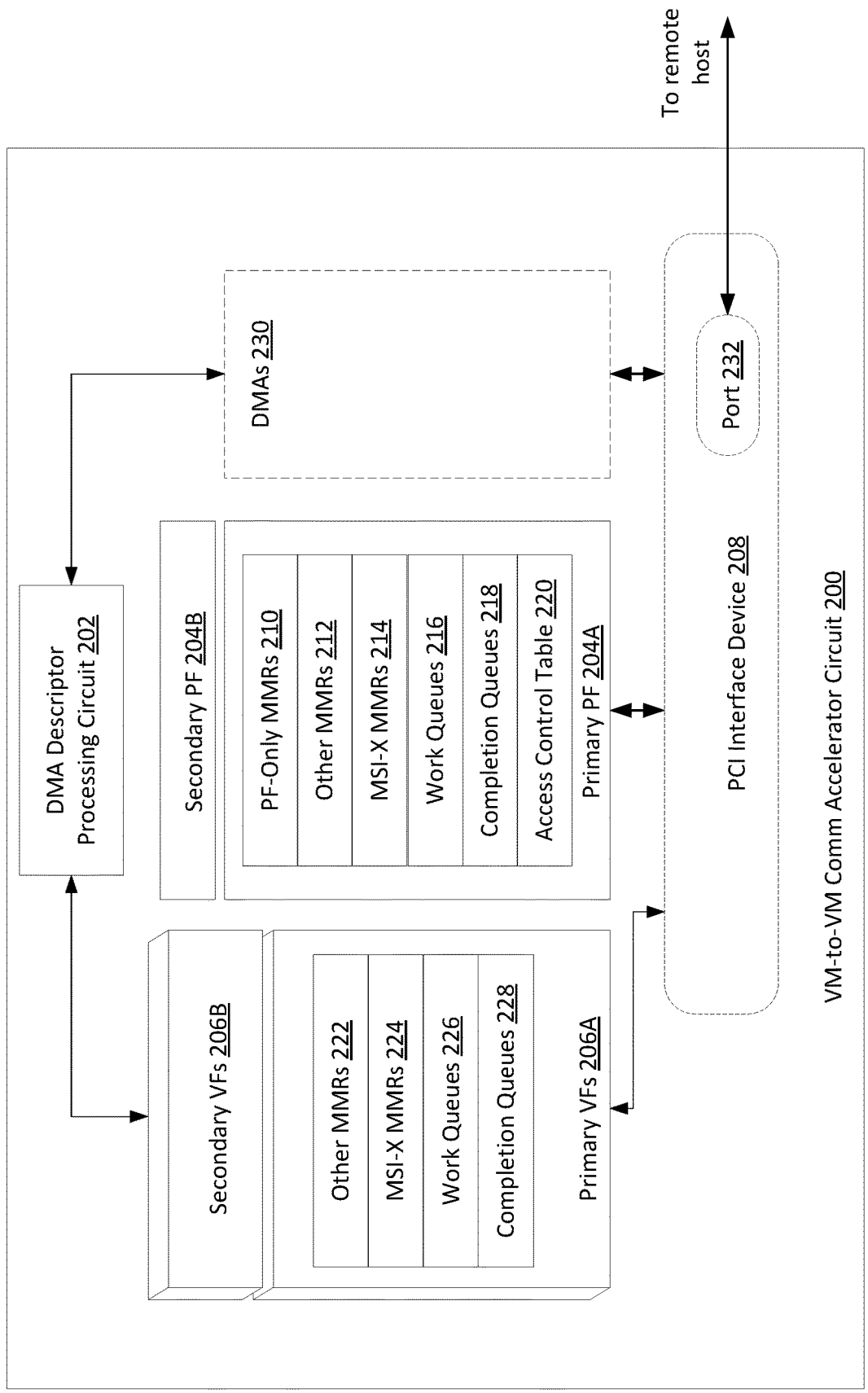
FIG. 2 illustrates a VM-to-VM communication accelerator circuit according to an embodiment of the present disclosure.

FIG. 2 illustrates a VM-to-VM accelerator circuit 200 according to an embodiment of the present disclosure. As shown in FIG. 2, accelerator 200 may include a DMA descriptor processing circuit 202, registers to store primary physical function 204A, registers to store primary virtual functions 206A, registers to store secondary physical function 204B, registers to store secondary virtual functions 206B, and a PCI interface device 208. DMA descriptor processing circuit 202 may receive DMA descriptors from VMs and establish, using PCI interface device 208, the VM-to-VM data communication based on the parameters stored in primary physical function 204A, primary virtual functions 206A, secondary physical function 204B, and secondary virtual function 206B. In another embodiment, PCI interface device 208 may be external to VM-to-VM accelerator circuit 200. PCI interface device 208, once set up, may provide direct memory access 230 to VMs bypassing VMMs.

In one embodiment, registers for storing physical functions and virtual functions are memory-mapped registers (MMRs) whose address ranges are specified according to base address registers (BARs) of PCI device. For example, a first physical base address register (PBAR0) may specify the address range of an MMR for storing the primary physical function 204A, and a second physical base address register (PBAR1) may specify the address range of an MMR for storing the secondary physical function 204B. Similarly, a first stack of virtual base address bars (VBAR0) may specify address ranges of MMRs, where each of the MMRs may store a respective primary virtual function, and a second stack of virtual base address bars (VBAR2) may specify address ranges of MMRs, where each of the MMRs may store a respective secondary virtual function.

Primary physical function 204A includes parameters associated with PCI interface device 208 of the local host. In one embodiment, the MMR for storing parameters of primary physical function 204A may include a physical function only MMR portion 210, other parameter MMR portion 212, an MSI-X MMR portion 214, a work queue portion 216, a completion queue portion 218, and an access control table portion 220. The MMR for storing parameters of secondary physical function 204B may include similar portions as the primary physical function 204A for storing parameters of a PCI device of a remote host. The MMR for storing each one of the primary virtual functions 206A may include other parameter MMR portion 222, an MSI-X MMR portion 224, a work queue portion 226, and a completion queue portion 228. The MMRs for storing secondary virtual functions 206B may include similar portions as the primary virtual function 206A for storing parameters associated VMs running on the remote host.

The physical functions 204A, 204B may be associated with data structures of a physical function only MMR portion 210 and an access control table 220. The virtual functions do not contain physical function only MMR portion 210 and access control table 220. MMR portions 212-218, 222-224 are common among physical functions and virtual functions. The physical function only MMR portion 210 may store the size of guest physical address space of each VM. The physical function only MMR portion 210 may be set up by VMM during the generation of VMs. Other MMR portion 212 may store control parameters related to establishing hardware-based VM-to-VM data communication. MSI-X MMR portion 214 may store a mask for different operations that could generate an interrupt. For example, the mask stored in in MSI-X may selectively enable or disable an interrupt generated by a write operation. Work queue 216 may contain an ordered list of DMA descriptors that is to be processed by DMA descriptor processing circuit 202. The completion queue 218 may contain an ordered list of DMA descriptors that have been processed by DMA descriptor processing circuit 202. Access control table 220 may store access permissions (e.g., read and write permissions) between different VMs on the same local host or between local host and remote host.

FIG. 3 illustrates an access control table 300 including entries for storing access permissions between VMs (either on a single host or between different hosts) according to an embodiment of the present disclosure. As shown in FIG. 3, access control table 300 may contain the access permissions to the memory domain of PCI device associated with primary physical function (L_PF) and assess permissions to the memory domains of VMs associated with primary virtual functions (e.g., L_VF1, L_VF$_2$, ... L_VF$_m$). Access control table 300 may further contain the access permissions to the memory domain of PCI device of a remote host associated with second physical function (R_PF) and assess permissions to the memory domains of VMs hosted on a remote host associated with secondary virtual functions (e.g., R_VF$_1$, ..., R_VF$_n$). The access permissions can be read (r), write (w), or not-accessible (not labeled). For example, as shown in FIG. 3, the local PCI device may have read and write permissions to all primary virtual functions of VMs supported on the local host and have read permission to all secondary virtual functions of VMs supported on the remote host. VM associated with primary virtual function (L_VF$_1$) may have the write permission to the primary physical function (L_PF), read and write permissions to primary virtual functions (L_VF$_2$ ... L_VF$_m$), and read permission to remote physical function (R_PR) and remote virtual functions (R_VF$_1$ ... R_VF$_n$).

Referring again to FIG. 2, a VM (e.g., identified by a virtual machine identifier VMID_i) supported by the local host may post a DMA descriptor to the working queue 226 in the virtual function 206A (e.g., VF_i) associated with the VM supported by the local host. The DMA descriptor can be a regular descriptor that contains control and status data, source data buffer, data length (e.g., in byte count), a destination data buffer, and a destination virtual function associated with a target VM. Alternatively, the DMA descriptor can be an embedded descriptor that contains control and status data, the data payload, a destination data buffer, and a destination virtual function associated with a target VM. The embedded DMA descriptor can be used to transmit small data payload that is smaller than a determined number of bytes. The control and status data of the DMA descriptor may contain parameters to populate in other MMR portion 222 and MSI-X MMR portion 224 of the virtual function 206A. DMA descriptor processing circuit 202 may add the posted DMA descriptor to the work queue 216 of the primary physical function 204A. Upon its turn to be processed, DMA descriptor processing circuit 202 may load the parameters stored in other MMR portion 222 and MSI-X MMR portion 224 to the corresponding MMR portions 212, 214.

When processing a DMA descriptor at the top of working queue 216, DMA descriptor processing circuit 202 may inspect the DMA descriptor to determine the originating VM and target VM and to determine whether the originating VM has the appropriate access permission to the target VM. If the originating VM has the access permission, the extended logic (VMX) of processor may translate guest physical address to the host physical address using page tables.

In one embodiment, the DMA descriptor may be a regular descriptor denoting a DMA access operation (write or read) between two VMs (e.g., from VFa to VFb) residing on a single host. The DMA descriptor may be in the work queue associated with VFa and the destination field of the DMA descriptor being set to VFb. The DMA descriptor processing circuit may first determine whether VFa has the access permission to write to or read from VFb based on the access control table and whether the destination data buffer associated with VFb is within the guest physical address (GPA) space of VFb shared with VFa. If the DMA descriptor processing circuit determines that VFa does not have the access permission or the destination data buffer is not within the GPA space of VFb shared with VFa, DMA descriptor processing circuit may report the error condition through the completion queue. Otherwise, for the write operation, the DMA descriptor processing circuit may generate PCIe read transactions with requester ID being set to VFa to read data from the VFa's GPA space, and write the data on PCIe bus with requester ID being set to VFb to write data to VFb's GPA space (to the region which is shared with VFa). For the read operation, the DMA descriptor processing circuit may generate PCIe read transactions with requester ID being set to VFb to read data from VFb's GPA space (from the region being shared with VFa), and write the data on PCIe bus with requester ID being set to VFa to write data to VFa's GPA space. The VMX logic circuit (e.g., VT-d logic) of the processor performs the translation from the guest physical addresses to corresponding host physical addresses using page tables. After processing the descriptor, the DMA descriptor processing circuit may write the completion of transmission status to the corresponding completion queue.

The DMA descriptor processing circuit may similarly process embedded DMA descriptors. The data payload (usually, small data payload) is stored in embedded DMA descriptors. The DMA descriptor may be in the work queue associated with VFa and the destination field of the DMA descriptor being set to VFb. The DMA descriptor processing circuit may first determine whether VFa has the access permission to write to VFb based on the access control table and whether the destination data buffer associated with VFb is within the guest physical address (GPA) space of VFb shared with VFa. If the DMA descriptor processing circuit determines that VFa does not have the access permission or the destination data buffer is not within the GPA space of VFb shared with VFa, DMA descriptor processing circuit may report the error condition through the completion queue. Otherwise, DMA descriptor processing circuit may write the data payload embedded in the DMA descriptor to write the data on PCIe bus with requester ID being set to VFb to write data to VFb's GPA space (to the region which is shared with VFa). The VMX logic circuit of the processor performs the translation from the guest physical addresses to corresponding host physical addresses using page tables. After processing the descriptor, the DMA descriptor processing circuit may write the completion of transmission status to the corresponding completion queue.

In one embodiment, the DMA descriptor may be a descriptor (regular or embedded) denoting a DMA access operation (write or read) between two VMs (e.g., from VFa to VFb) residing on two hosts. The DMA descriptor may be in the work queue associated with VFa residing on a local host and the destination field of the DMA descriptor being set to VFb residing on a remote host. VFa may be identified as a primary virtual function, and VFb may be identified by a secondary virtual function on the local host. The DMA descriptor processing circuit may first determine whether VFa has the access permission to write to or read from VFb based on the access control table including primary and secondary functions, and whether the destination data buffer associated with VFb is within the guest physical address (GPA) space of VFb shared with VFa. If the DMA descriptor processing circuit determines that VFa does not have the access permission or the destination data buffer is not within the GPA space of VFb shared with VFa, DMA descriptor processing circuit may report the error condition through the completion queue. Otherwise, for the write operation, the DMA descriptor processing circuit may generate PCIe read transactions with requester ID being set to VFa to read data from the VFa's GPA space, and write the data on PCIe bus with requester ID being set to VFb to write data to VFb's GPA space (to the region which is shared with VFa). For the read operation, the DMA descriptor processing circuit may generate PCIe read transactions with requester ID being set to VFb to read data from VFb's GPA space (from the region being shared with VFa), and write the data on PCIe bus with requester ID being set to VFa to write data to VFa's GPA space. The VMX logic circuit (e.g., VT-d logic) of the remote processor performs the translation from the guest physical addresses to corresponding host physical addresses using page tables. After processing the descriptor, the DMA descriptor processing circuit may write the completion of transmission status to the corresponding completion queue.

Figure 4:
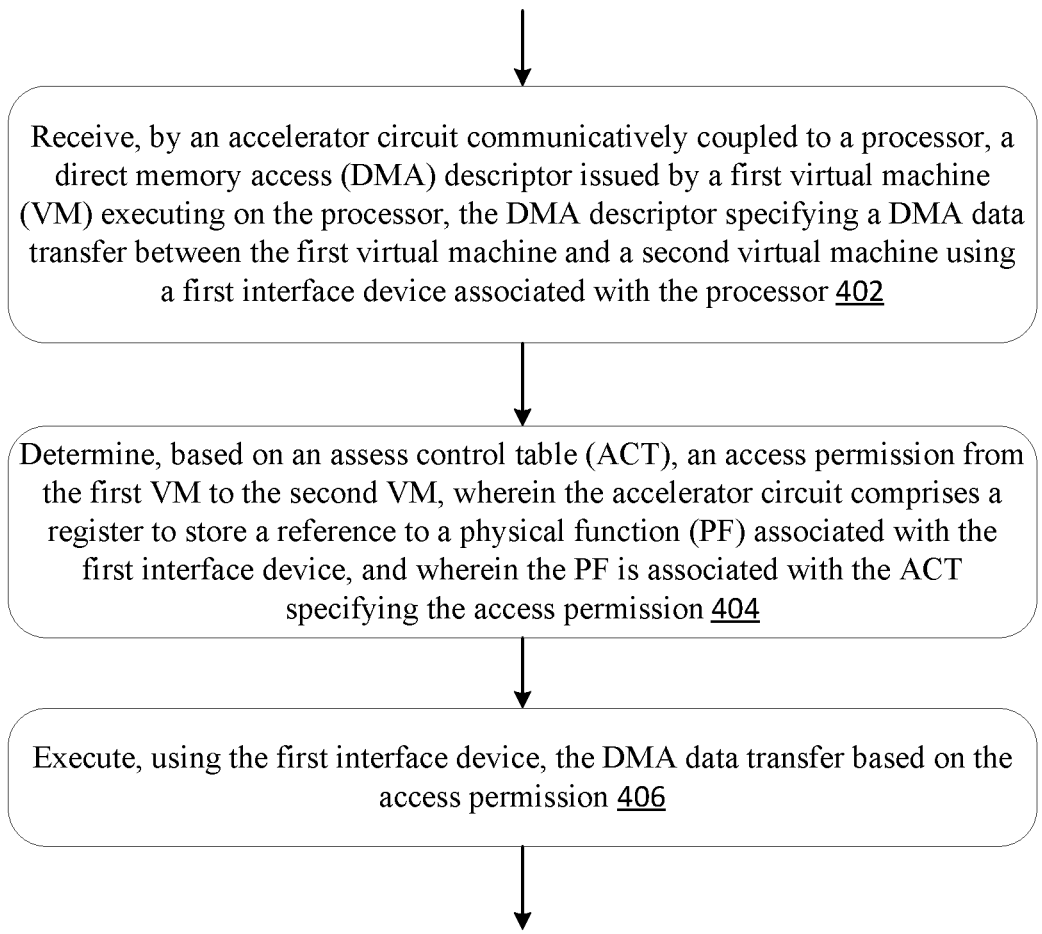
FIG. 4 is a block diagram of a method to perform, using PCI devices, VM-to-VM data communication according to another embodiment of the present disclosure.

FIG. 4 is a block diagram of a method 400 to perform, using PCI devices, VM-to-VM data communication according to another embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 and DMA descriptor processing circuit 118A as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states using a state diagram or events.

Referring to FIG. 4, at 402, the accelerator circuit may receive a direct memory access (DMA) descriptor issued by a first virtual machine executing on the processor, the DMA descriptor specifying a DMA data transfer between the first virtual machine (VM) and a second virtual machine using a first interface device associated with the processor.

At 404, the accelerator circuit may determine, based on an access control table (ACT), an access permission from the first VM to the second VM, wherein the accelerator circuit comprises a register to store a reference to a physical function (PF) associated with the first interface device, and wherein the PF is associated with the ACT specifying the access permission.

At 406, the accelerator circuit may execute, using the first interface device, the DMA data transfer based on the access permission.

Figure 5A:
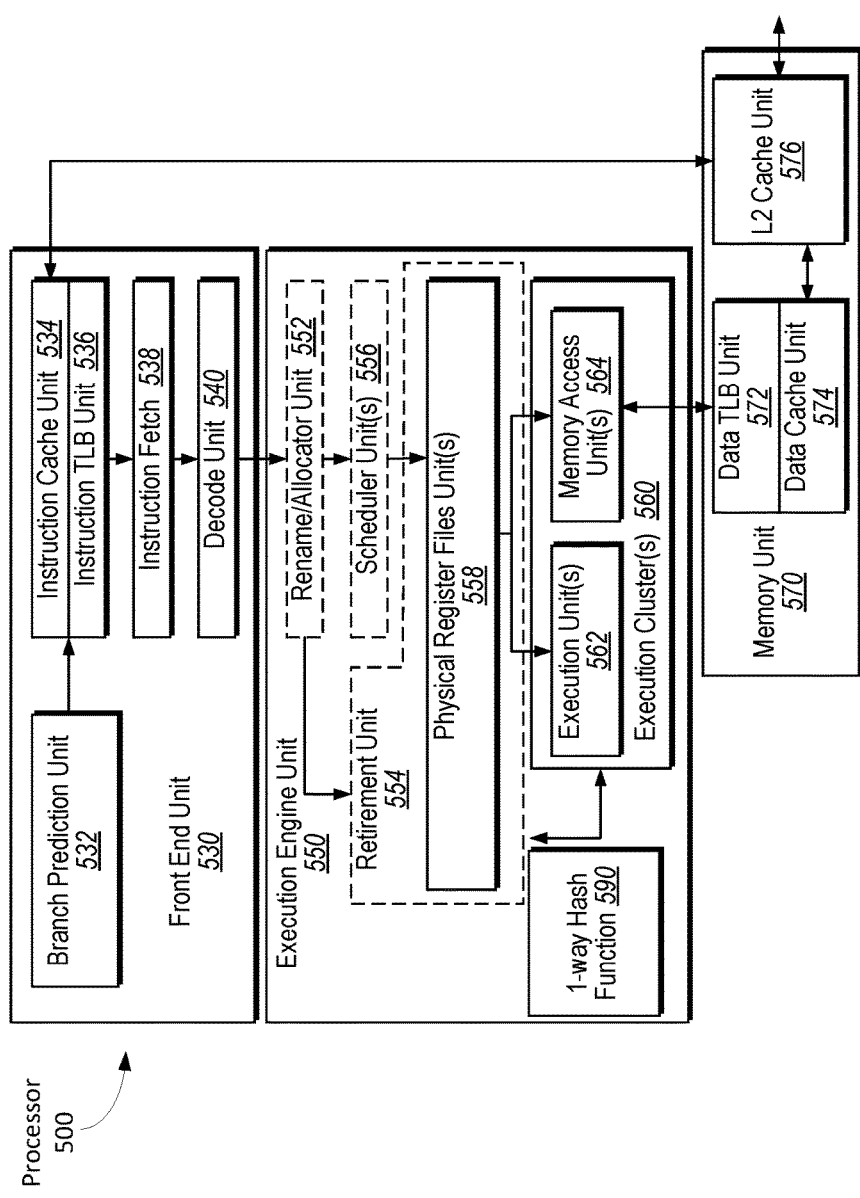
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 108A described with respect to FIG. 1. In particular, processor 500 may include the VM-to-VM communication accelerator circuit 104A and PCI interface device 106A as shown in FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
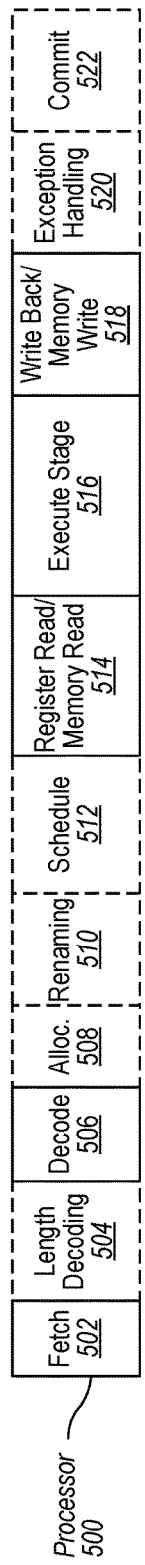
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor 500 as a pipeline includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
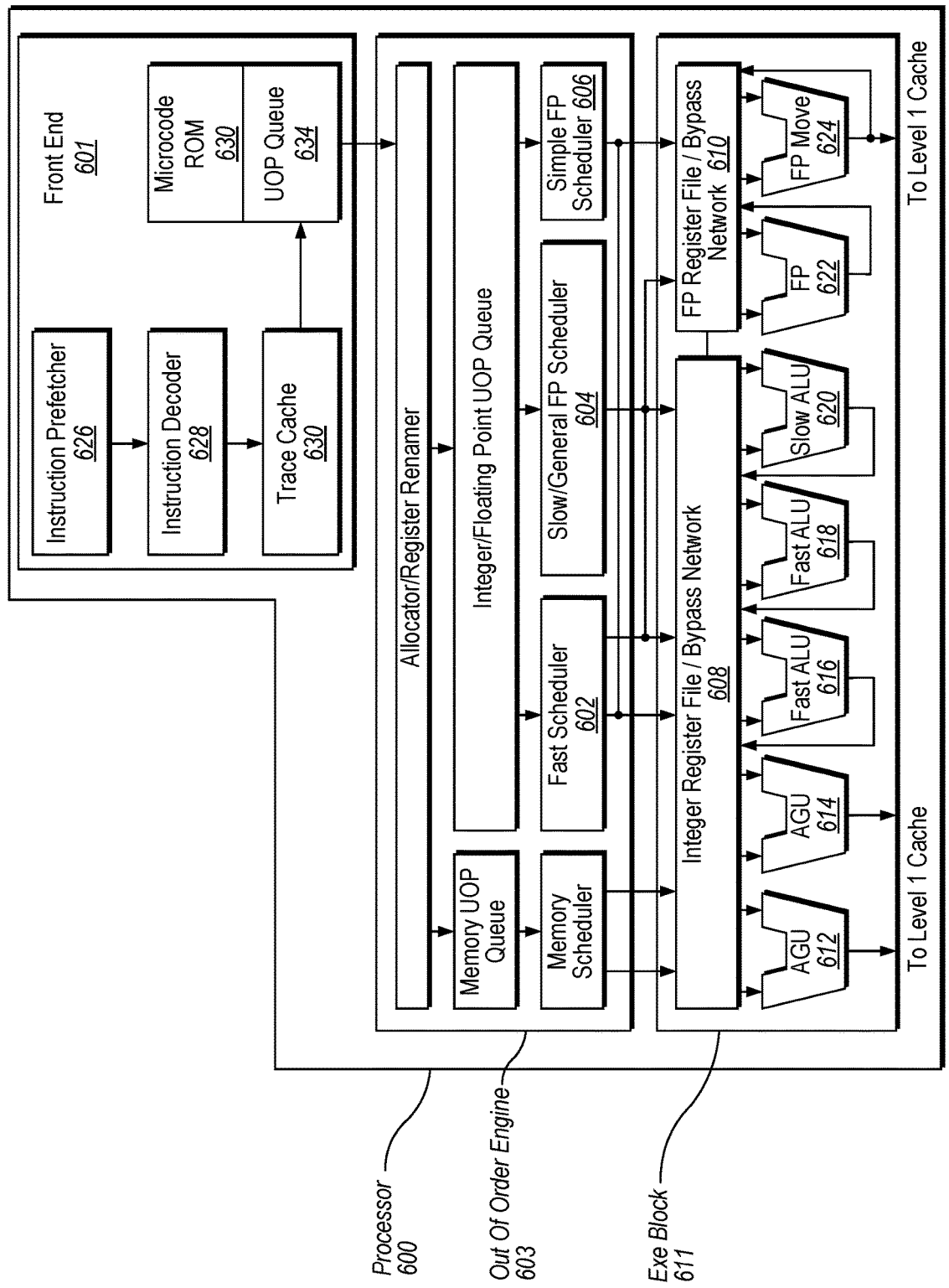
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
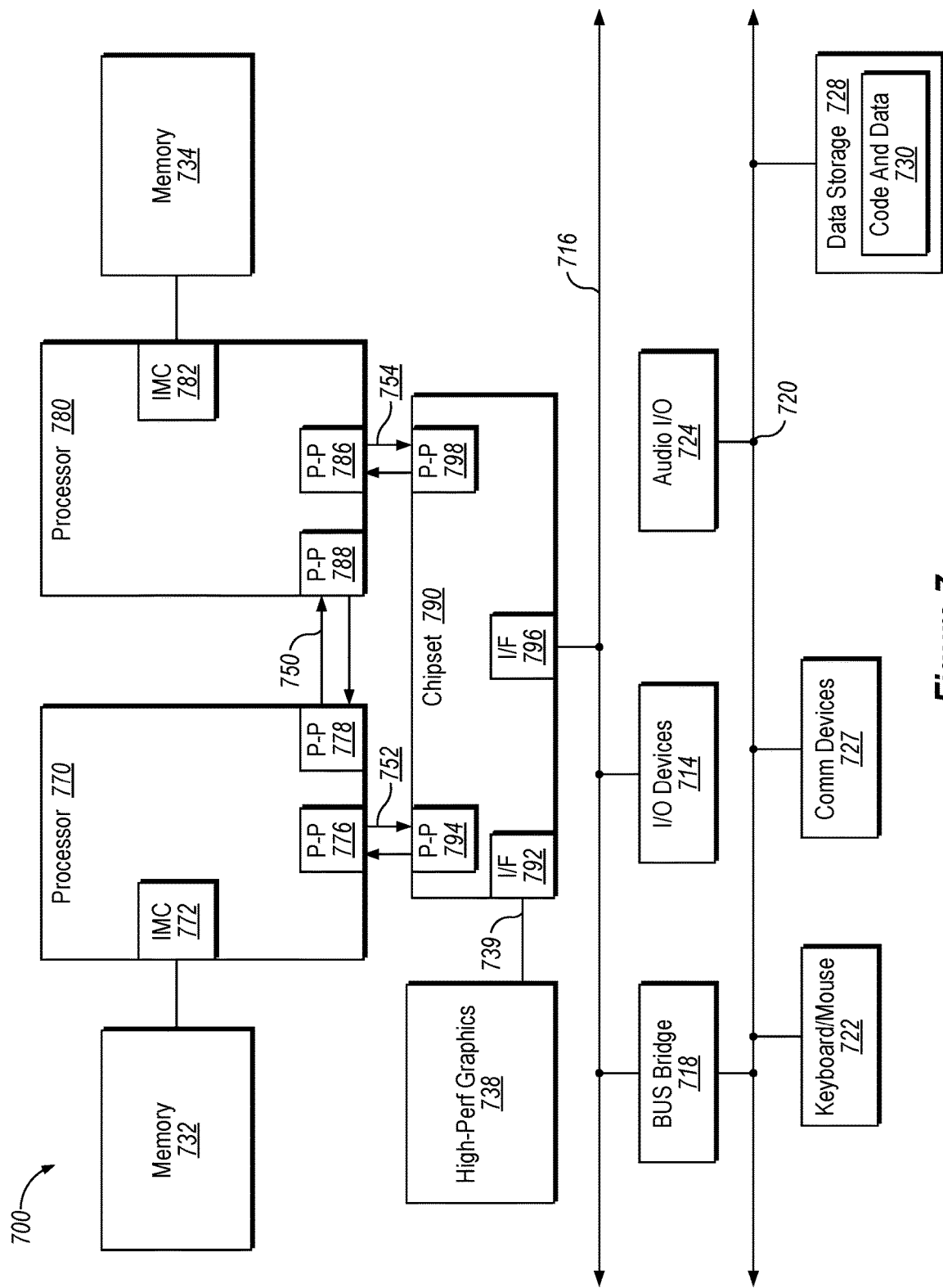
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
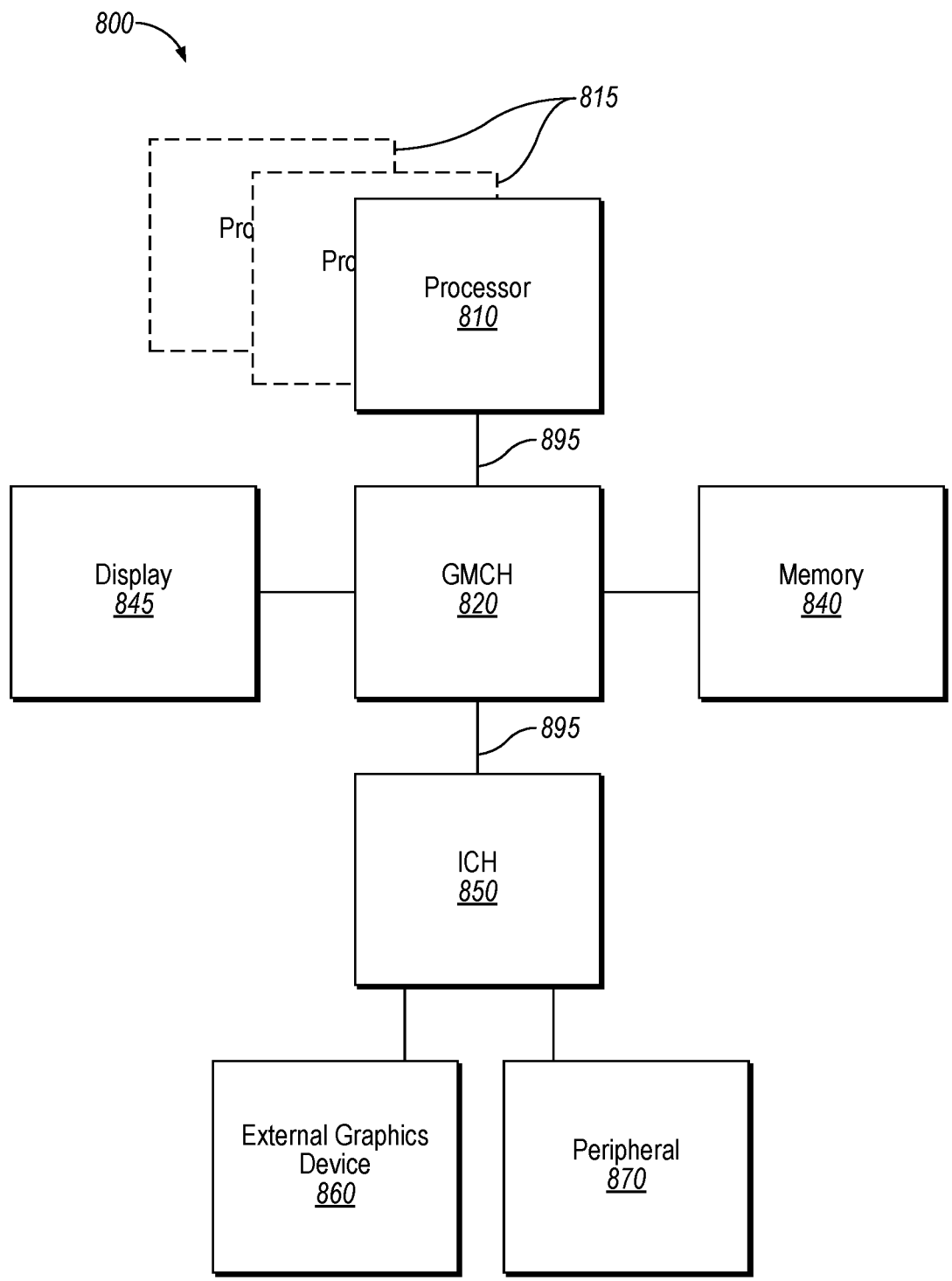
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
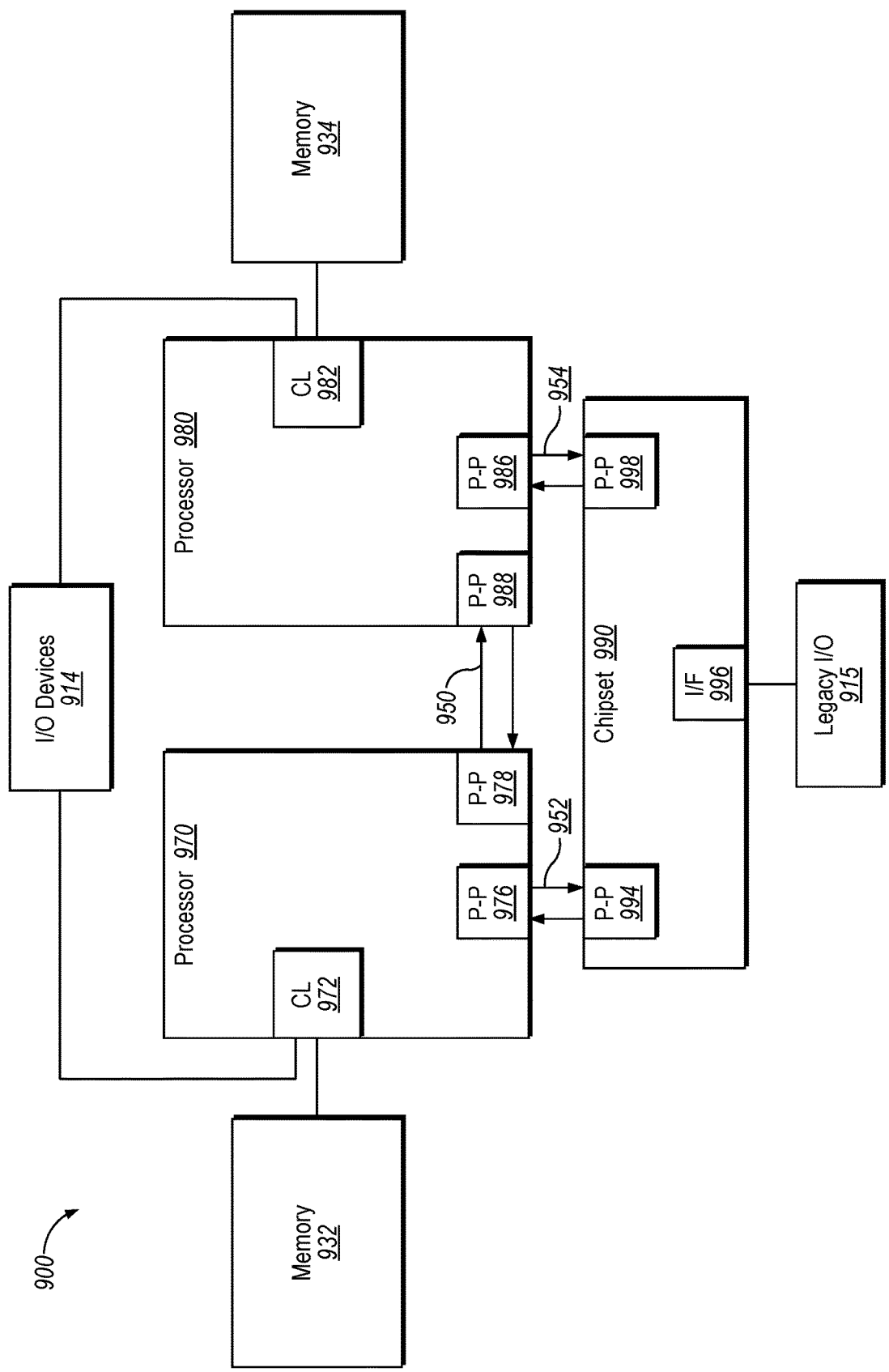
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
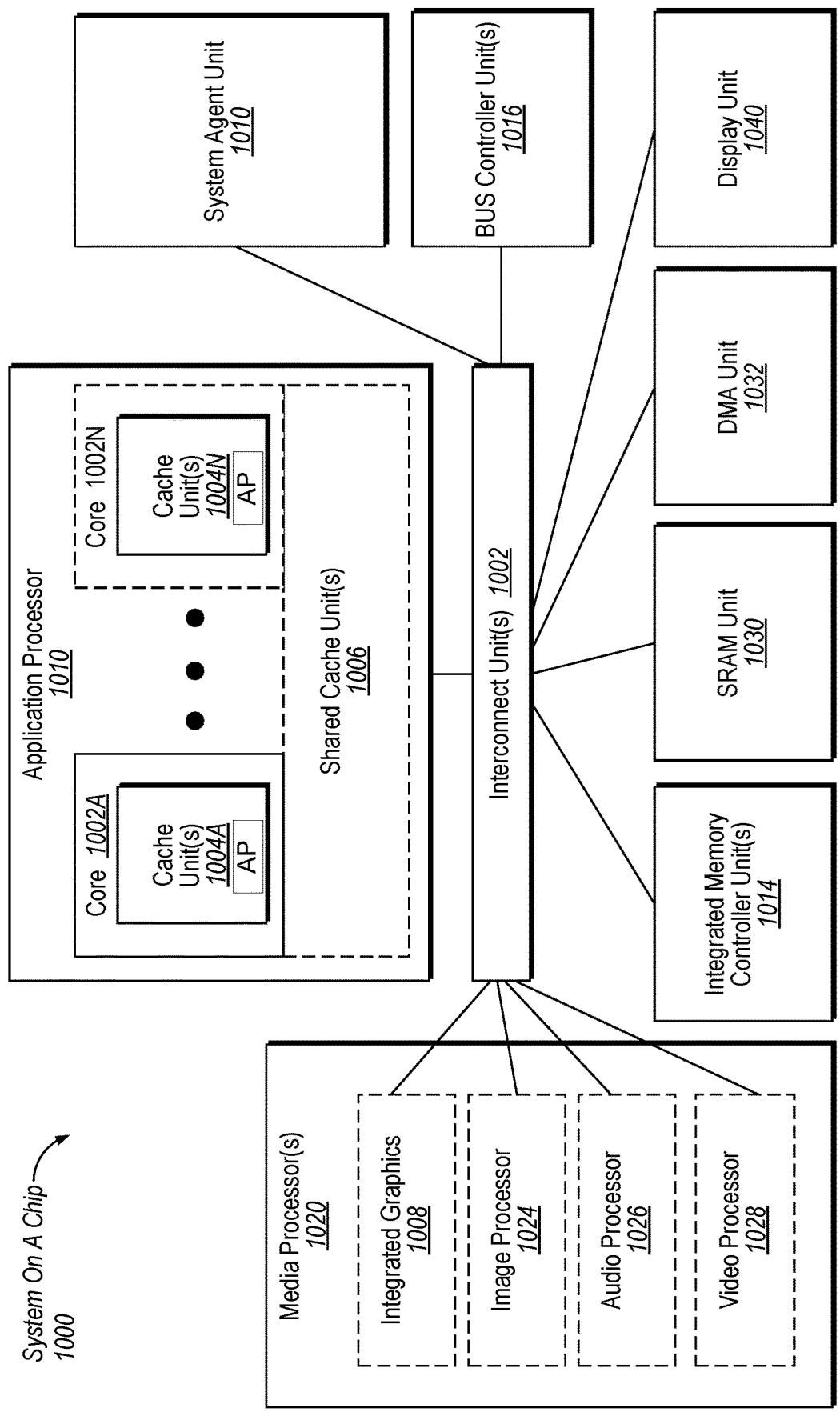
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In some implementations, SoC 1000 as shown in FIG. 10 includes features of the SoC 100 as shown in FIG. 1. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
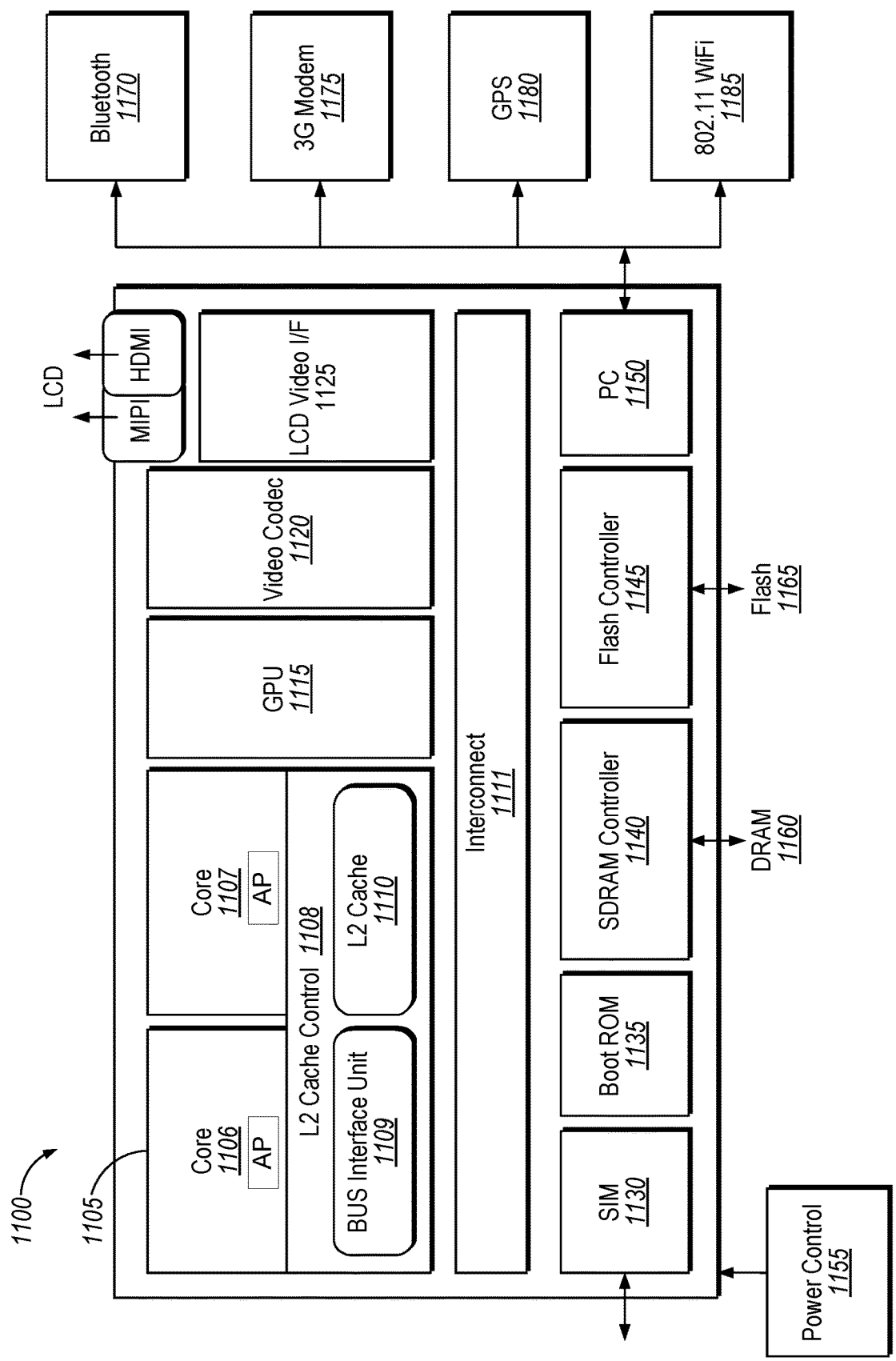
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
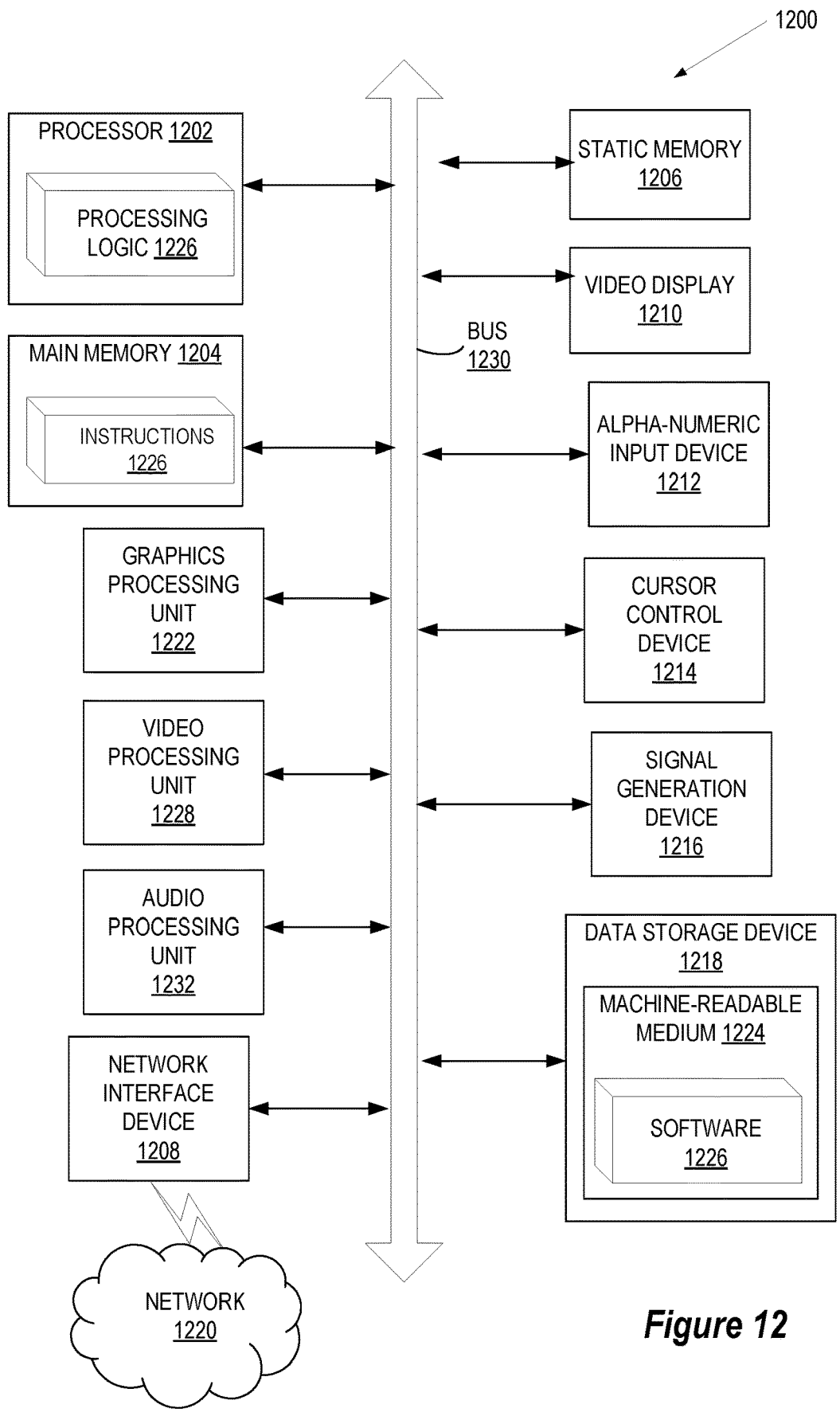
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. For example, processing logic 1226 may perform operations as described in FIG. 4. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing system comprising a processor to execute a first virtual machine (VM), and a VM-to-VM communication accelerator circuit, communicatively coupled to the processor, the VM-to-VM communication accelerator circuit comprising a first interface device to support direct memory access (DMA) data transfers by the first VM, a register to store a reference to a primary physical function (PF) associated with the first interface device, wherein the first primary PF is associated with an access control table (ACT) specifying an access permission for the first VM with respect to a second VM, and a direct memory access (DMA) descriptor processing circuit to process, using a working queue associated with the first primary PF, a DMA descriptor referencing a request for a DMA data transfer between the first VM and the second VM, and execute, using the first interface device, the DMA data transfer based on the access permission.

In Example 2, the subject matter of Example 1 can further provide that the communication accelerator circuit further comprises a second register to store a reference to a secondary PF associated with a second interface device of a remote processing system hosting the second VM.

In Example 3, the subject matter of any of Examples 1 and 2 can further provide that the first PF is further associated with a completion queue referencing a plurality of DMA descriptors processed by the DMA descriptor processing circuit.

In Example 4, the subject matter of any of Examples 1 and 2 can further provide that the VM-to-VM communication accelerator circuit further comprises a third register to store a reference to a primary virtual function (VF) associated with a first virtual device driver of the first VM, wherein the primary VF is associated with a working queue referencing a first plurality of DMA descriptors issued by the first VM and a completion queue referencing a second plurality of DMA descriptors issued by the first VM and processed by the DMA descriptor processing circuit, and wherein the VM-to-VM communication accelerator circuit further comprises one or more registers to store a reference to a secondary VF associated with a second virtual device of the second VM, and wherein the second interface device is to perform DMA data transfers issued by the second VM to the first VM.

In Example 5, the subject matter of any of Examples 1 and 2 can further provide that the DMA descriptor processing circuit is further to responsive to receiving a DMA descriptor issued by the first VM, identify the second VM as a destination of the DMA data transfer, determine, based on the ACT, that the first VM has a write permission to the second VM, execute, using the first interface device and the second interface device, the DMA data transfer from the first VM to the second VM, and responsive to determining that the DMA data transfer from the first VM to the second VM is completed, place the DMA descriptor on a completion queue of the first PF function.

In Example 6, the subject matter of Example 1 can further provide that the access permission comprises at least one of a read permission, a write permission, or an execute permission.

In Example 7, the subject matter of Example 1 can further provide that the DMA descriptor comprises a virtual function identifier associated with a first virtual device of the first VM, a destination data address associated with a memory, and one of a source data address associated with the memory or a data payload.

In Example 8, the subject matter of Example 1 can further provide that the second VM resides on the first processing system, and wherein a virtual machine monitor (VMM) controls the first VM and the second VM.

In Example 9, the subject matter of any of Examples 1 and 8 can further provide that the DMA descriptor processing circuit is further to responsive to receiving the DMA descriptor posted by the first VM, identify the second VM as a destination of the DMA data transfer, determine that the first VM has a write permission to the second VM based on the ACT, execute, using the first interface device and the second interface device, the DMA data transfer from the first VM to the second VM, and responsive to determining that the DMA data transfer from the first VM to the second VM is completed, place the DMA descriptor on a completion queue of the first PF function.

Example 10 is a system including a first interface device to support direct memory access (DMA) data transfers by a first virtual machine (VM) and a VM-to-VM communication accelerator circuit, communicatively coupled to a processor to execute the first VM, the VM-to-VM communication accelerator circuit comprising a register to store a reference to a primary physical function (PF) associated with the first interface device, wherein the first primary PF is associated with an access control table (ACT) specifying an access permission for the first VM with respect to a second VM, and a direct memory access (DMA) descriptor processing circuit to process, using a working queue associated with the first primary PF, a DMA descriptor referencing a request for a DMA data transfer between the first VM and the second VM, and execute, using the first interface device, the DMA data transfer based on the access permission.

In Example 11, the subject matter of Example 10 can further provide that the communication accelerator circuit further comprises a second register to store a reference to a secondary PF associated with a second interface device of a remote processing system hosting the second VM.

In Example 12, the subject matter of any of Examples 10 and 11 can further provide that the first PF further is further associated with a completion queue referencing a plurality of DMA descriptors processed by the DMA descriptor processing circuit.

In Example 13, the subject matter of any of Examples 10 and 11 can further provide that the VM-to-VM communication accelerator circuit further comprises a third register to store a reference to a primary virtual function (VF) associated with a first virtual device driver of the first VM, wherein the primary VF is associated with a working queue referencing a first plurality of DMA descriptors issued by the first VM and a completion queue referencing a second plurality of DMA descriptors issued by the first VM and processed by the DMA descriptor processing circuit, and wherein the VM-to-VM communication accelerator circuit further comprises one or more registers to store a reference to a secondary VF associated with a second virtual device of the second VM, and wherein the second interface device performs DMA data transfers issued by the second VM to the first VM.

In Example 14, the subject matter of any of Examples 10 and 11 can further provide that the DMA descriptor processing circuit is further to responsive to receiving a DMA descriptor issued by the first VM, identify the second VM as a destination of the DMA data transfer, determine, based on the ACT, that the first VM has a write permission to the second VM, execute, using the first interface device and the second interface device, the DMA data transfer from the first VM to the second VM, and responsive to determining that the DMA data transfer from the first VM to the second VM is completed, place the DMA descriptor on a completion queue of the first PF function.

In Example 15, the subject matter of Example 10 can further provide that the access permission comprises at least one of a read permission, a write permission, or an execute permission.

In Example 16, the subject matter of Example 10 can further provide that the DMA descriptor comprises a virtual function identifier associated with a first virtual device of the first VM, a destination data address associated with a memory, and one of a source data address associated with the memory or a data payload.

In Example 17, the subject matter of Example 10 can further provide that the second VM resides on the first processing system, and wherein a virtual machine monitor (VMM) controls the first VM and the second VM.

In Example 18, the subject matter of any of Examples 10 and 17 can further provide that the DMA descriptor processing circuit is further to responsive to receiving the DMA descriptor posted by the first VM, identify the second VM as a destination of the DMA data transfer, determine that the first VM has a write permission to the second VM based on the ACT, execute, using the first interface device and the second interface device, the DMA data transfer from the first VM to the second VM, and responsive to determining that the DMA data transfer from the first VM to the second VM is completed, place the DMA descriptor on a completion queue of the first PF function.

Example 19 is a method including receiving, by an accelerator circuit communicatively coupled to a processor, a direct memory access (DMA) descriptor issued by a first virtual machine (VM) executing on the processor, the DMA descriptor specifying a DMA data transfer between the first virtual machine and a second virtual machine using a first interface device associated with the processor, determining, based on an access control table (ACT), an access permission from the first VM to the second VM, wherein the accelerator circuit comprises a register to store a reference to a physical function (PF) associated with the first interface device, and wherein the PF is associated with the ACT specifying the access permission, and executing, using the first interface device, the DMA data transfer based on the access permission.

In Example 20, the subject matter of Example 19 can further provide that the second VM resides on a remote processing system that is communicatively coupled to the processor using a second interface device.

Example 21 is an apparatus comprising: means for performing the method of any of Examples 19 and 20.

Example 22 is a machine-readable non-transitory medium having stored thereon program code that, when executed, perform operations comprising receiving, by an accelerator circuit communicatively coupled to a processor, a direct memory access (DMA) descriptor issued by a first virtual machine (VM) executing on the processor, the DMA descriptor specifying a DMA data transfer between the first virtual machine and a second virtual machine using a first interface device associated with the processor, determining, based on an access control table (ACT), an access permission from the first VM to the second VM, wherein the accelerator circuit comprises a register to store a reference to a physical function (PF) associated with the first interface device, and wherein the PF is associated with the ACT specifying the access permission, and executing, using the first interface device, the DMA data transfer based on the access permission.

In Example 23, the subject matter of Example 22 can further provide that the second VM resides on a remote processing system that is communicatively coupled to the processor using a second interface device.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system comprising:
    a processor to execute a first virtual machine (VM); and
    a VM-to-VM communication accelerator circuit, communicatively coupled to the processor, the VM-to-VM communication accelerator circuit comprising:
        a first interface device to support direct memory access (DMA) data transfers by the first VM;
        a register to store a reference to an access control table (ACT) specifying an access permission for the first VM with respect to a second VM; and
        a direct memory access (DMA) descriptor processing circuit to:
            process, using a working queue, a DMA descriptor referencing a request for a DMA data transfer between the first VM and the second VM; and
            execute, using the first interface device, the DMA data transfer based on the access permission.

2. The processing system of claim 1, wherein the register is further to store a reference to a physical function associated with the first interface device.

3. The processing system of claim 1, wherein the access permission comprises at least one of a read permission, a write permission, or an execute permission.

4. The processing system of claim 1, wherein the DMA descriptor comprises an identifier associated with the first VM, a destination data address associated with a memory, and one of a source data address associated with the memory or a data payload.

5. The processing system of claim 1, wherein the second VM resides on a remote processing system, and wherein a virtual machine monitor (VMM) controls the first VM and the second VM.

6. The processing system of claim 2, wherein the register is further to store a completion queue referencing a plurality of DMA descriptors processed by the DMA descriptor processing circuit.

7. The processing system of claim 2, wherein the DMA descriptor processing circuit is further to:
    responsive to receiving a DMA descriptor issued by the first VM, identify the second VM as a destination of the DMA data transfer;
    determine, based on the ACT, that the first VM has a write permission to the second VM;
    execute, using the first interface device and a second interface device, the DMA data transfer from the first VM to the second VM; and
    responsive to determining that the DMA data transfer from the first VM to the second VM is completed, place the DMA descriptor on a completion queue.

8. The processing system of claim 5, wherein the DMA descriptor processing circuit is further to:
    responsive to receiving the DMA descriptor posted by the first VM, identify the second VM as a destination of the DMA data transfer;
    determine that the first VM has a write permission to the second VM based on the ACT;
    execute, using the first interface device and a second interface device, the DMA data transfer from the first VM to the second VM; and
    responsive to determining that the DMA data transfer from the first VM to the second VM is completed, place the DMA descriptor on a completion queue.

9. A system, comprising:
    a first interface device to support direct memory access (DMA) data transfers by a first virtual machine (VM); and
    a VM-to-VM communication accelerator circuit, communicatively coupled to a processor to execute the first VM, the VM-to-VM communication accelerator circuit comprising:
        a register to store an access control table (ACT) specifying an access permission for the first VM with respect to a second VM; and
        a direct memory access (DMA) descriptor processing circuit to: process, using a working queue, a DMA descriptor referencing a request for a DMA data transfer between the first VM and the second VM; and execute, using a first interface device, the DMA data transfer based on the access permission.

10. The system of claim 9, wherein the register is further to store a reference to a physical function associated with the first interface device.

11. The system of claim 9, wherein the register is further to store a completion queue referencing a plurality of DMA descriptors processed by the DMA descriptor processing circuit.

12. The system of claim 9, wherein the access permission comprises at least one of a read permission, a write permission, or an execute permission.

13. The system of claim 9, wherein the DMA descriptor comprises an identifier associated with the first VM, a destination data address associated with a memory, and one of a source data address associated with the memory or a data payload.

14. The system of claim 9, wherein the second VM resides on a remote processing system, and wherein a virtual machine monitor (VMM) controls the first VM and the second VM.

15. The system of claim 11, wherein the DMA descriptor processing circuit is further to:
- responsive to receiving a DMA descriptor issued by the first VM, identify the second VM as a destination of the DMA data transfer;
- determine, based on the ACT, that the first VM has a write permission to the second VM;
- execute, using the first interface device and a second interface device, the DMA data transfer from the first VM to the second VM; and
- responsive to determining that the DMA data transfer from the first VM to the second VM is completed, place the DMA descriptor on the completion queue.

16. The system of claim 14, wherein the DMA descriptor processing circuit is further to:
- responsive to receiving the DMA descriptor posted by the first VM, identify the second VM as a destination of the DMA data transfer;
- determine that the first VM has a write permission to the second VM based on the ACT;
- execute, using the first interface device and a second interface device, the DMA data transfer from the first VM to the second VM; and
- responsive to determining that the DMA data transfer from the first VM to the second VM is completed, place the DMA descriptor on a completion queue.

17. A method comprising:
- receiving, by an accelerator circuit communicatively coupled to a processor, a direct memory access (DMA) descriptor issued by a first virtual machine (VM) executing on the processor, the DMA descriptor specifying a DMA data transfer between the first virtual machine and a second virtual machine using a first interface device associated with the processor;
- determining, based on an access control table (ACT), an access permission from the first VM to the second VM, wherein the accelerator circuit comprises a register to store a reference to the ACT specifying the access permission; and
- executing, using the first interface device, the DMA data transfer based on the access permission.

18. The method of claim 17, wherein the second VM resides on a remote processing system that is communicatively coupled to the processor using a second interface device.

19. The method of claim 17, wherein the register is further to store a reference to a physical function associated with the first interface device.

20. The method of claim 17, further comprising:
- responsive to receiving a DMA descriptor issued by the first VM, identifying the second VM as a destination of the DMA data transfer;
- determining, based on the ACT, that the first VM has a write permission to the second VM;
- executing, using the first interface device and a second interface device, the DMA data transfer from the first VM to the second VM; and
- responsive to determining that the DMA data transfer from the first VM to the second VM is completed, placing the DMA descriptor on a completion queue.

* * * * *